April 22, 1947. E. W. EVANS 2,419,257
SLIP GAGE
Filed Sept. 11, 1945
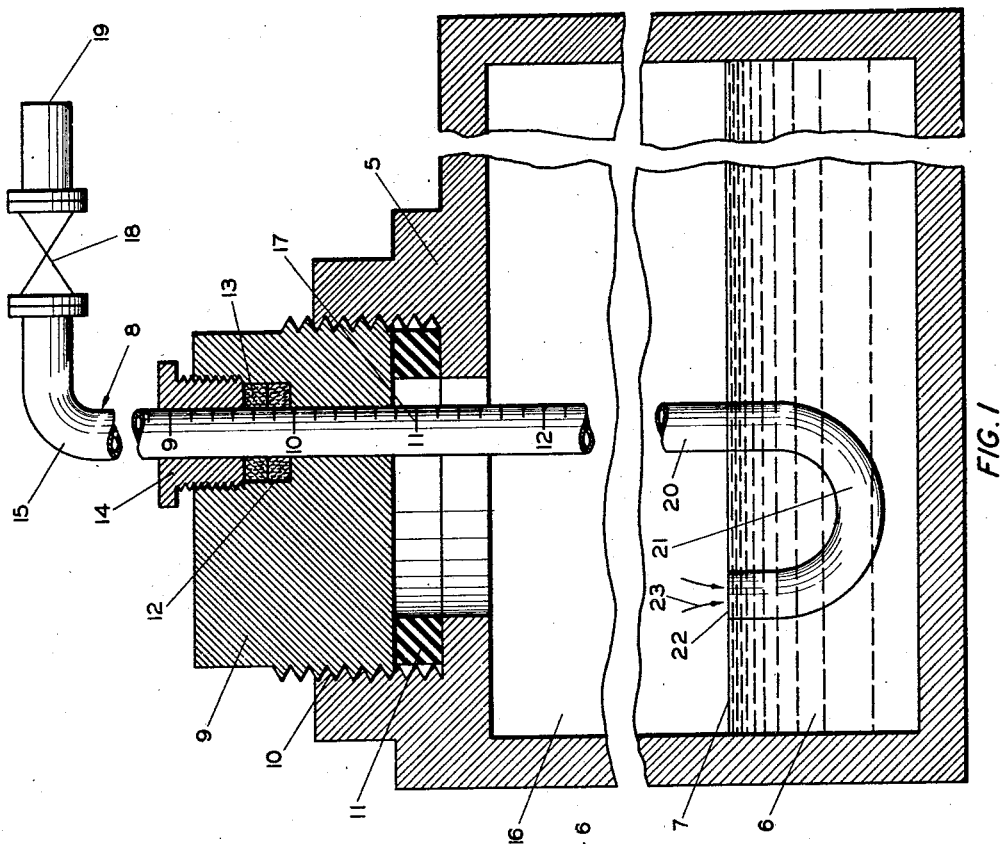
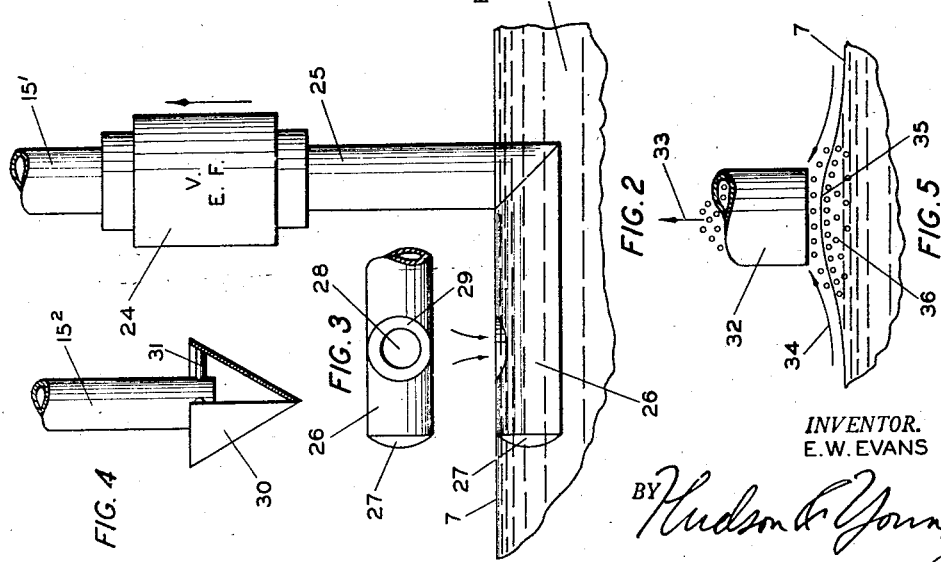
INVENTOR.
E. W. EVANS
BY Hudson & Young
ATTORNEYS Patented Apr. 22, 1947

2,419,257

UNITED STATES PATENT OFFICE 2,419,257

SLIP GAGE

Edmond W. Evans, Bartlesville, Okla., assignor to Phillips Petroleum Company, a corporation of Delaware Application September 11, 1945, Serial No. 615,654

5 Claims. (Cl. 73—298)

This invention relates to slip gages. In a more specific aspect, it relates to slip gages having a lower end containing an upwardly directed inlet opening.

In the prior art of gaging large containers, such as tank cars, truck tanks, and storage tanks, by means of slip tubes or slip gages, a small error in measuring the liquid level may mean a large error in estimating the volume of liquid in the tank. When the liquid is a liquified petroleum gas, such as propane, this difficulty in obtaining the correct liquid level is increased.

The slip gage of the prior art consists of a slip tube 9 as shown in Bond 1,521,668, patented January 6, 1925. This tube 9 has a downwardly directed opening in its lower end which tends to entrain liquid prematurely as will be explained further with reference to Figure 4 below.

One object of this invention is to prevent such premature entrainment of liquid.

Another object is to provide a more accurate slip tube gage.

Another object is to increase the efficiency of the slip tube method of gaging liquids by eliminating any tendency toward premature entrainment or aspiration of liquids.

Numerous other objects and advantages will be apparent to those skilled in the art upon reading the accompanying specification, claims, and drawings.

In the drawing:

Figure 1 is an elevational, cross-sectional view of a container having a slip tube gage embodying the present invention, with parts broken away.

Figure 2 is an elevational view of a modified second type of lower end for a slip gage embodying my invention, with parts broken away.

Figure 3 is a plan view of the structure shown in Figure 2 with parts broken away.

Figure 4 is an elevational view with the cone quarter sectioned of a modified third type of lower end for a slip gage embodying my invention.

Figure 5 is an elevational view of a slip gage of the prior art showing premature entrainment of liquid, parts being broken away.

In Figure 1 a container 5 contains a liquid 6 the liquid level 7 of which it is desired to measure. A slip gage generally designated as 8 is provided to measure liquid level 7.

Gage 8 is mounted on a container 5 by any suitable means. For purpose of illustration, a cover plate 9 is shown screw threaded at 10 into container 5 and, if desired, a sealing gasket 11 may be provided.

Cover 9 has a stuffing box 12 formed therein with the usual packing material 13 and any suitable gland 14.

A measuring discharge tube 15 is provided which passes through stuffing box 12 into the interior of container 5. Obviously, other known apparatus may be substituted for stuffing box 12 provided tube 15 may be moved vertically therethrough and a sealing is maintained around tube 15 so that the vapors 16 of liquid 6 can not escape from container 5.

Tube 15 may be provided with numbered graduations such as 17, but such graduations are unnecessary if other means are employed to determine the vertical position of tube 15. In order to prevent loss of vapor or liquid through tube 15, a cut-off valve 18 is provided which may be opened during gaging and closed at other times. The end 19 of tube 15 is open to the atmosphere and may be in the form of a nozzle, if desired, or merely wide open as shown.

The lower portion 20 of tube 15 is bent in a return bend at 21 and the lower end of tube 15 is provided with an upwardly directed opening 22 into which the vapors 16 are moving as shown by the arrows 23.

In Figure 2, the upper portion of tube 15' is exactly the same as the upper portion of tube 15 as shown in Figure 1. Attached to the lower part of tube 15' is a valve housing 24 containing an excess flow valve (not shown). These excess flow valves are common in the liquified petroleum gas art. Attached to housing 24 as an extension of tube 15' is a lower tube 25 provided with an arm 26 extending tangent to the liquid level 7 of liquid 6 in container 5. As shown in Figures 2 and 3, the end 27 is closed and an opening 28 is provided, lying in the plane of the liquid level 7. A lip 29 is provided so that the opening 28 will be in a single plane.

While excess flow valve 24 has been shown in Figure 2 and has not been shown in Figure 1, it should be realized that the slip gage tube 15 or 15' can be operated either with or without excess flow valve 24. However, I prefer to employ valve 24 for safety.

In Figure 4 the upper portion of tube $15^2$ is exactly the same as the upper portion of tube 15 as shown in Figure 1, and may or may not contain an excess flow valve (not shown). A conical cap 30 is secured to tube $15^2$ by means of one or more rods 31. Between rods 31, which rods are of limited extent, are a series of upwardly directed openings for the tube. If rods 31 are located below the upper edge of cone 30, then these upwardly directed openings merge and may be regarded as one continuous opening if desired.

Operation

Before explaining the operation of the present invention, it is desired to explain the difficulties of the prior art as shown in Figure 5. The slip gage tube 32 of the prior art has a downwardly directed opening therein and as the lower end of 32 approaches liquid level 7 it tends to entrain liquid prematurely for the following reasons.

As 32 approaches 7 with the valve (such as 18) open, the vapors passing up tube 32, as indicated by arrow 3, cause vapors to rush across the surface of 7 at high velocity as indicated by arrows 34. These high velocity vapors 34 tend to entrain and pick up droplets of liquid. The high velocity indicates a low pressure and the direct suction from tube 32 aids in decreasing this pressure, as a result the surface 7 rises as shown at 35 and there is boiling or the formation of gas bubbles such as 36 beneath surface 35. Liquid with gas bubbles 36 therein is lighter which results in elevation of surface 35.

As a result of the above mentioned effects, the material being discharged through opening 19 of the slip gage to the atmosphere may appear to change from gas to liquid in a neighborhood of ½ inch from where the liquid level 7 actually is. This effect may be larger or smaller depending upon the pressure and temperature conditions and upon the nature of liquid 6, but ½ inch multiplied by the area of the largest portion of a railroad tank car is a considerable error. As all payments for liquified petroleum gas are made on volumes obtained by slip gages, the error is believed important enough to deserve correction. If the error were constant, it could be accounted for; but the error varies with varying conditions.

The operation of Figure 1 will now be described. The operator loosens gland 14 so that tube 15 may be moved vertically and valve 18 is opened. Upon opening valve 18, a substantially transparent cloud of vapor blows out opening 19. Upon lowering tube 15 until opening 22 is a slight amount below level 7, the cloud being expelled through opening 19 becomes white and opaque due to liquid 6 in opening 22. Upon raising opening 22 to the same elevation as level 7, the white cloud at 19 again becomes transparent. The position of 15 may be read from graduations 17, or if graduations 17 are not present, other measurements may be made in an obvious manner.

The operation of Figures 2 and 3 is the same as the operation of Figure 1 except that an excess flow valve 24 is shown. Valve 24 can be used in Figure 1 and can be eliminated in Figure 2 if desired. It is preferred, however, to have excess flow valve 24 in both the structure in Figures 1 and 2 for safety. Excess flow valve 24 remains open during all manipulations of valve 18, but if the tube 15 were sheared or broken off then the large increase in flow through the remaining portion of tube 15 would cause valve 24 to automatically close, and valve 24 would then stay closed until an opportunity to replace the slip tube gage had occurred.

The operation of Figure 4 is the same as the operation of Figure 1 except that an upwardly directed opening is provided all around the pipe, which provides ample area for flow of fluid from all directions. The overflowing at the top of cone 30 provides an accurate gage.

Formal changes may be made in the specific embodiment of the invention disclosed without departing from the spirit and substance of the broad invention, the scope of which is commensurate with the appended claims.

Having described my invention, I claim:

1. A slip tube gage for large containers comprising a stuffing box mounted in the upper portion of said container, and a measuring discharge tube having an upwardly disposed inlet opening in its lower end, said tube being disposed for vertical movement through said stuffing box whereby the liquid level in said container may be gaged without error due to premature aspiration of liquid.

2. A slip tube gage for large containers comprising a stuffing box mounted in the upper portion of said container, and a measuring discharge tube disposed for vertical movement through said stuffing box, the lower end of said tube being open and the lower portion of said tube being bent in a return bend so that the opening in the lower end of said tube is directed upward and may lie in the same plane as any liquid level in said container and be spaced in said plane from the remainder of said tube whereby accurate gaging is achieved.

3. A slip tube gage for large containers comprising a stuffing box mounted in the upper portion of said container, and a measuring discharge tube disposed for vertical movement through said stuffing box, the lower end of said tube being provided with a cover providing a reentrant upwardly disposed opening around said tube which may lie in the same plane as any liquid level in said container whereby accurate gaging is achieved.

4. In a slip tube gage for large containers comprising a stuffing box mounted in the upper portion of said container, a measuring discharge tube disposed for vertical movement through said stuffing box, an excess flow valve in the lower portion of said tube controlling fluid flow therethrough and a shut off valve in the upper portion of said tube, the improvement consisting of providing said measuring discharge tube with an upwardly disposed inlet opening in its lower end, whereby the liquid level in said container may be gaged without error due to premature aspiration of liquid.

5. In a slip tube gage for large containers comprising a stuffing box mounted in the upper portion of said container, a measuring discharge tube disposed for vertical movement through said stuffing box and a shut off valve in the upper portion of said tube, the improvement consisting of providing said measuring discharge tube with an upwardly disposed inlet opening in its lower end, whereby the liquid level in said container may be gaged without error due to premature aspiration of liquid.

EDMOND W. EVANS.

REFERENCES CITED

The following references are of record in the file of this patent:

UNITED STATES PATENTS

| Number | Name | Date |
| --- | --- | --- |
| 2,215,594 | Parsons | Sept. 24, 1940 |